No. 818,135. PATENTED APR. 17, 1906.
A. WARREN.
TUBE CUTTER.
APPLICATION FILED DEC. 16, 1905.
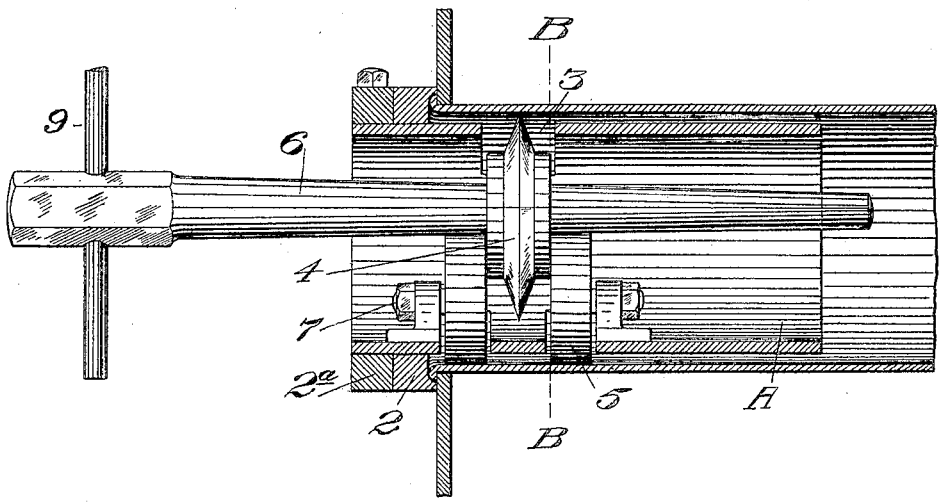
Fig. 1.
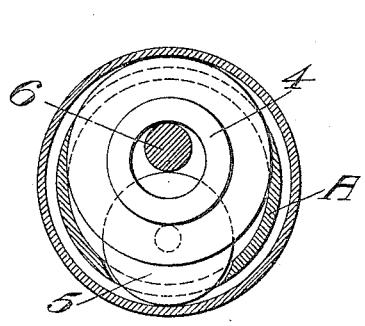
Fig. 2.
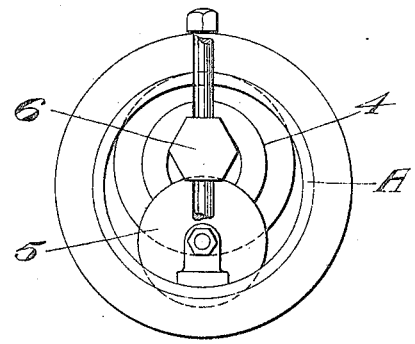
Fig. 4. Fig. 3.
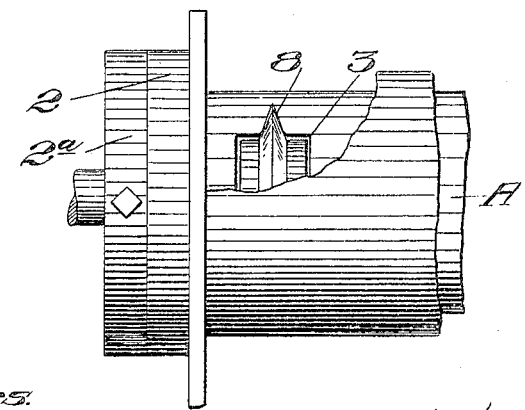
Witnesses: Inventor:
Alfred Warren
By Geo. H. Strong, Atty.

UNITED STATES PATENT OFFICE.

ALFRED WARREN, OF SAN LUCAS, CALIFORNIA.

TUBE-CUTTER.

No. 818,135.  Specification of Letters Patent.  Patented April 17, 1906.

Application filed December 16, 1905. Serial No. 292,075.

*To all whom it may concern:*

Be it known that I, ALFRED WARREN, a citizen of the United States, residing at San Lucas, in the county of Monterey and State of California, have invented new and useful Improvements in Tube-Cutters, of which the following is a specification.

My invention relates to a device for cutting off from the interior tubes of any description. It is especially useful to cut off tubes the ends of which are fixed and which are only accessible from the interior, such as boiler-tubes.

My invention consists in the combination of parts and in details of construction, which will be more fully explained by reference to the accompanying drawings, in which—

Figure 1 is a longitudinal section of my tube-cutter. Fig. 2 is a section on line B B. Fig. 3 is an end view. Fig. 4 is a broken-away view showing the notch 8 in the segmental slot 3.

In my invention I provide a tube A, having a diaphragm such that it will pass easily into the end of the tube to be cut. A collar 2 is fixed near the end of the tube A, and when this tube is introduced into the one to be cut it abuts against the flue-sheet or other fixed part. A segmental slot is made in the tube A, as shown at 3, and this slot is adapted to receive the cutter. The slot is made at such a distance from the collar 2 that when the cutter is in place it will lie within the flue-sheet or other part in which the tube is fixed and at such a distance therefrom as it may be desired to cut the tube. The cutter 4 consists of a hollow hub having a circular V-shaped centrally-located flange projecting outward from this hub, the edge being sharpened, as shown, and sufficiently hard for the purpose of cutting the metal tube. This cutter is dropped into the open slot 3, and the hub where it projects upon each side of the cutting-blade is between rollers 5, which are journaled within the tube A, so that their peripheries project through slots in the tube opposite to the slot 3. The edge of the cutter projects through its slot a certain distance, and when the apparatus has been introduced into the tube to be cut the loose cutter 4 may be pressed outwardly, so that its edge may be made to travel around a circle where the cut is to be made, the rollers 5 supporting the apparatus against the opposite inner side of the tube and forming an antifrictional bearing, so that the apparatus may be easily revolved. The diameter of the rollers 5 is such that the inner periphery intersects the central opening of the cutter.

In order to force the cutter out against the inner periphery of the tube, I have shown a tapered spindle 6, which may be introduced through the central opening of the cutter, and when so introduced one side of the spindle will rest against the tops of the rollers 5, where they intersect the cutter, and the other side will press against the interior of the opening in the cutter, thus forcing the cutter out against the interior of the tube to be cut. The pressure upon the spindle, forcing it into the opening in the cutter, may be increased as the cut proceeds until by its constant revolution the outer tube will be finally cut through with a clean cut.

The rollers 5 are positioned and supported by journal-pins 7, upon which they are turnable. These journal-pins are fixed in any suitable support within the tube A upon opposite sides of the segmental slot 3 and sufficiently separated to allow the cutter 4 to drop between them, and as there must be an open space between these rollers to admit the cutter the supports for the journal-shafts of the rollers 5 are only shown at the outer ends.

In order to maintain the cutter in its proper position and prevent its shifting, I have shown the segmental slot 3 as having V-shaped notches 8 upon opposite sides, so that the corresponding edge of the cutter will revolve in these slots and the cutter will thus be prevented from shifting endwise.

The operation of the device will then be as follows: The apparatus would be introduced into the tube to be cut with the collar 2 abutting against the outer surface of the flue-sheet or other part in which the tube to be cut is fixed, and the rollers 5 will then bear against the inner surface of the tube upon one side of the apparatus, and the cutter will project through its slot 3 upon the opposite side. The tapering spindle is then introduced through the hollow hub of the cutter, and, turning between the rollers 5 on one side and against the inner periphery of the hub of the cutter upon the opposite side, it will be seen that pressure upon this spindle will force the cutter outwardly against the interior of the tube to be cut, and by the revolution of the spindle its frictional contact with the bearing-rollers and cutter will revolve the whole of the apparatus within the tube, thus causing the cutter to travel successively over the interior and forming a line or channel which will eventually sever the tube. A bar 9 serves to turn the spindle. When applied to the cutting of boiler-tubes, each end will be cut in this way, and the tube will then be left free within the boiler to be moved through the usual handholds at the ends. The section which remains in the tube-sheet is easily removed by cutting the bead or flange and bending this short section of the tube inwardly by indenting one side so as to loosen it and allow it to be removed. As the face of the flue-sheet is usually rough, I prefer to employ a second collar $2^a$ exterior to the collar 2, and as these two collars are faced and smooth when lubricated they will turn easily upon each other. The inner collar 2 is preferably countersunk or chambered on its inner side, so that the chamber will fit over the bead or flange of the tube to be cut and the face of the collar will rest against the flue-sheet. Thus this collar, which may be loose upon the tube A, bearing against which the collar $2^a$, which is fixed to the tube A, will be turnable with sufficient freedom for the purpose required.

It will be manifest that the cutter and its adjuncts may be placed at any desired distance from the end of the tube A to meet the requirements of the work to be done.

Having thus described my invention, what I claim, and desire to secure by Letters Patent, is—

1. In a tube-cutter, a sleeve fitting loosely within the tube to be cut having a collar bearing against the end of the tube and its supporting flue-sheet, a segmental opening made through the sleeve, adapted to receive a circular cutter, rollers journaled within the sleeve, said sleeve having segmental openings through which the peripheries of these rollers project to form a bearing against the inner surface of the tube to be cut and in opposition to the cutter, a tapering spindle passing through the cutter and bearing upon one side on the interior periphery of the journaled rollers and on the other against the interior of the central opening of the cutter.

2. In a tube-cutter, a sleeve loosely turnable within the tube to be cut having a collar to bear against the outer end of the tube and flue-sheet, rollers journaled within the sleeve having their peripheries projecting through slots on one side thereof, a circular V-shaped cutter having a hollow hub, the ends of said hub projecting at each side of the cutter and turnable between the interior periphery of the journaled rollers, the interior curvature of said rollers intersecting the curvature of the opening through the cutter-hub, and a tapering spindle adapted to pass through the cutter-hub and by pressure against the rollers and the interior of the hub to force the cutter into contact with the interior of the tube to be cut, and means whereby the spindle and sleeve are revolved.

3. In a tube-cutter, a sleeve or tubular support loosely turnable within a tube to be cut having a collar upon its outer end contacting with the end of the tube or face of the tube-sheet, rollers journaled within the sleeve with their peripheries projecting through open slots upon one side of the sleeve, a segmental slot upon the opposite side having V-shaped grooves formed in its ends, a V-shaped cutter having a hollow hub projecting upon each side of the cutter and adapted to rest upon the inner peripheries of the journaled rollers the V-shaped portion of the cutter being turnable and guided by the V-shaped grooves at the end of the segmental channel and means by which the cutter is forced outwardly against the interior of the tube to be cut.

4. In a tube-cutter, a hollow revoluble part having a segmental opening upon one side within which a circular V-shaped cutter is revolubly guided, rollers journaled within the revoluble part with their peripheries projecting through slots in said part in opposition to the cutter, a hollow hub on the cutter turnable between the rollers, a countersunk collar fitting loosely upon the revoluble part and inclosing the bead or flange of the tube to be cut, a second collar fixed upon the revoluble part and faced to turn freely against the first-named collar, a tapering spindle extending through the hub of the cutter and bearing upon one side against the interior of said hub and upon the other against the journaled rollers, and means whereby said spindle may be revolved to turn the cutter around within the tube to be cut.

In testimony whereof I have hereunto set my hand in presence of two subscribing witnesses.

ALFRED WARREN.

Witnesses:
S. H. NOURSE,
D. B. RICHARDS.